United States Patent
Saraf

(10) Patent No.: US 10,178,071 B2
(45) Date of Patent: Jan. 8, 2019

(54) TECHNIQUES TO USE OPERATING SYSTEM REDIRECTION FOR NETWORK STREAM TRANSFORMATION OPERATIONS

(71) Applicant: Facebook, Inc., Menlo Park, CA (US)

(72) Inventor: Gahl Saraf, Bat Hefer (IL)

(73) Assignee: FACEBOOK, INC., Menlo Park, CA (US)

( * ) Notice: Subject to any disclaimer, the term of this patent is extended or adjusted under 35 U.S.C. 154(b) by 218 days.

(21) Appl. No.: 15/187,360

(22) Filed: Jun. 20, 2016

(65) Prior Publication Data

US 2017/0366508 A1  Dec. 21, 2017

(51) Int. Cl.
*H04L 29/06* (2006.01)
*H04L 29/08* (2006.01)

(52) U.S. Cl.
CPC ...... *H04L 63/0272* (2013.01); *H04L 63/0281* (2013.01); *H04L 63/0471* (2013.01); *H04L 63/20* (2013.01); *H04L 65/601* (2013.01); *H04L 67/02* (2013.01); *H04L 67/28* (2013.01)

(58) Field of Classification Search
CPC ............. H04L 67/125; H04L 67/2814; H04L 67/2819; H04L 67/2828; H04L 67/2804; H04L 67/2823; H04L 67/327; H04L 63/10; H04L 65/40; H04L 65/4069; H04L 63/0272; H04L 63/20; H04L 63/0471; H04L 63/0281; H04L 67/28
See application file for complete search history.

(56) References Cited

U.S. PATENT DOCUMENTS

| 9,585,085 | B1* | 2/2017 | Guo | H04L 43/0876 |
| 2012/0005476 | A1* | 1/2012 | Wei | H04L 63/0272 |
| | | | | 713/153 |
| 2013/0133043 | A1* | 5/2013 | Barkie | H04L 63/10 |
| | | | | 726/4 |
| 2013/0291086 | A1* | 10/2013 | Pontillo | H04L 63/0823 |
| | | | | 726/10 |

(Continued)

OTHER PUBLICATIONS

Cyberoam, Managing Bandwidth—The User Based Approach, 9 pages (Year: 2008).*

(Continued)

*Primary Examiner* — Hadi S Armouche
*Assistant Examiner* — Huan V Doan

(57) ABSTRACT

Techniques to use operating system redirection for network stream transformation operations are described. In one embodiment, an apparatus may comprise a network stream component operative to receive a network stream, the network stream associated with an application on a device; modify the network stream to generate a modified network stream; and send the modified network stream through an operating system for the device; and a local virtual private network component operative on the processor circuit to: receive the modified network stream from the operating system as a plurality of modified network stream packets; determine a network connection policy based on the application; and send the plurality of modified network stream packets to a destination network address via the network interface controller when the network connection policy indicates sending. Other embodiments are described and claimed.

17 Claims, 12 Drawing Sheets

*Dynamic Local VPN System 100*

(56) References Cited

U.S. PATENT DOCUMENTS

2013/0298201 A1* 11/2013 Aravindakshan ... H04L 63/0272
726/4
2014/0024339 A1* 1/2014 Dabbiere ............ H04M 15/885
455/406
2016/0072716 A1* 3/2016 Chow ................. H04L 47/2475
709/219

OTHER PUBLICATIONS

Lufei et al, On the Effects of Bandwidth Reduction Techniques in Distributed Applications, 10 pages (Year: 2004).*

* cited by examiner

*600*

```
Receive an application network connection from the
application on the device, the application network connection
received as a plurality of application network connection
packets.
602
```

```
Modify the plurality of application network connection
packets for resending through the operating system.
604
```

```
Send the plurality of application network connection packets
through the operating system to generate a network stream.
606
```

```
Receive the network stream, the network stream associated
with an application on a device.
608
```

TECHNIQUES TO USE OPERATING SYSTEM REDIRECTION FOR NETWORK STREAM TRANSFORMATION OPERATIONS

BACKGROUND

Mobile devices may run applications, commonly known as "apps," on behalf of their users. These applications may execute as processes on a device. These application may engage in network activity on the mobile device, such as may use wireless signals, including Wi-Fi, cellular data, and/or other technologies.

Cellular carriers may provide cellular data communication to their cellular customers. For example, smart phones and other mobile devices may run web browsers that may be used while on the cellular network to retrieve web pages. Additionally, many applications that may be pre-installed or user-installed on a mobile device may use cellular data communication to access remote data, such as resources available on the Internet.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to use operating system redirection for network stream transformation operations. Some embodiments are particularly directed to techniques to use operating system redirection for network stream transformation operations where the resending of network data through an operating system is used to convert a packetized network connection to a network stream and to convert a network stream to a packetized network connection. In one embodiment, for example, an apparatus may comprise a network stream component operative to receive a network stream, the network stream associated with an application on a device; modify the network stream to generate a modified network stream; and send the modified network stream through an operating system for the device; and a local virtual private network component operative on the processor circuit to: receive the modified network stream from the operating system as a plurality of VPN network connection packets; determine a network connection policy based on the application; and send the plurality of VPN network connection packets to a destination network address via the network interface controller when the network connection policy indicates sending. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6A illustrates an embodiment of a first portion of a logic flow for the system of FIG. 1.

DETAILED DESCRIPTION

Figure 1:
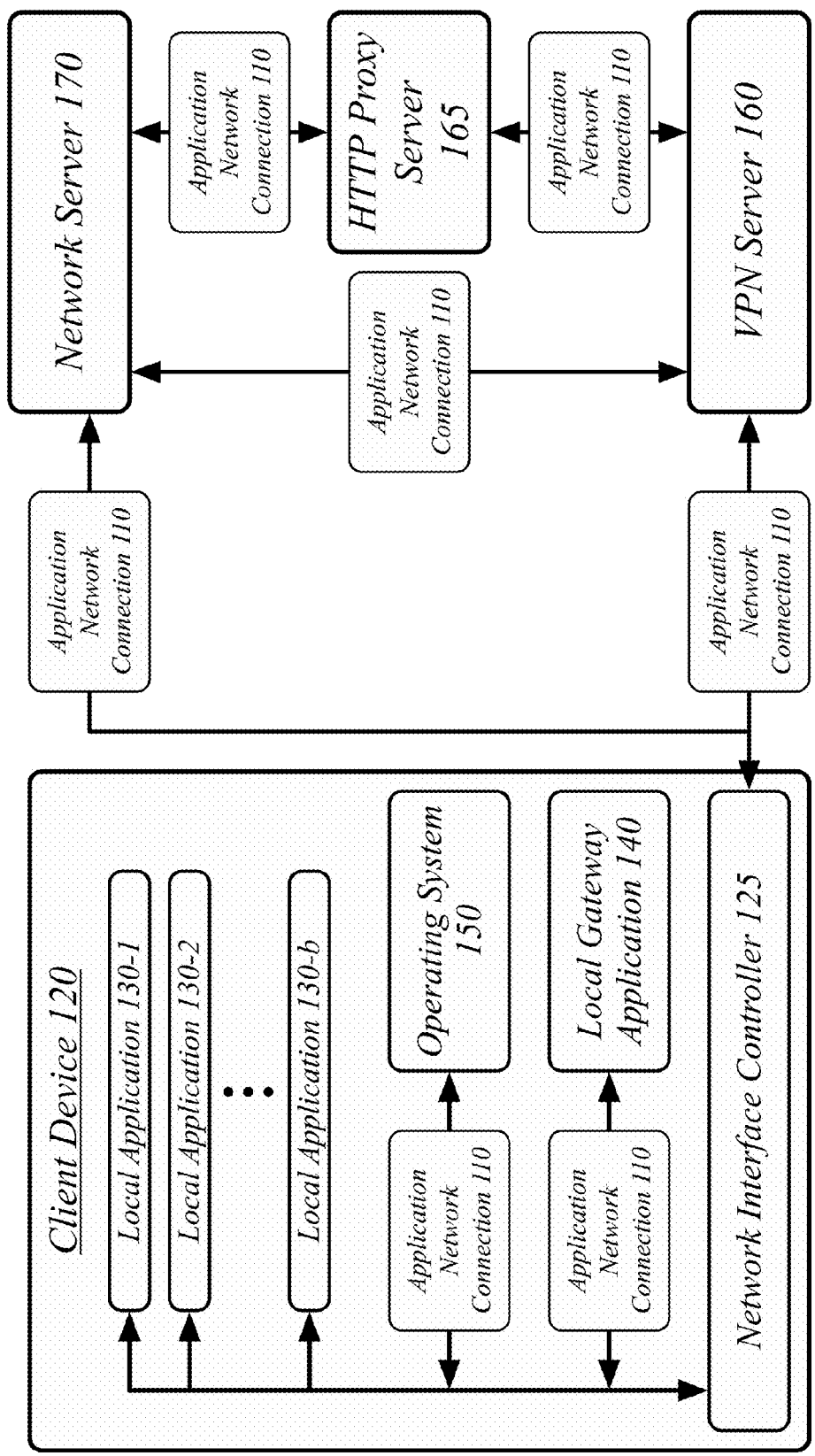
FIG. 1 illustrates an embodiment of a dynamic local VPN system.

The availability of cellular and other wireless data networks empowers users to enjoy a wide variety of applications on their mobile devices. These applications may use wireless data to provide information and other services to their users. However, it may be difficult or impractical for users to manage the network usage of their applications.

The management of network usage may be particularly valuable to users which primarily, significantly, or even partially use cellular data networks due to the limited network data usage that may be provided to users of cellular data networks. A subscribing mobile user may be provided a mobile data allocation for a defined period (e.g., monthly) based on their subscription, with additional mobile data usage either prohibited or invoking an additional charge. A prepaid mobile user may be provided a mobile data allocation based on the details of their prepaid purchase, with additional mobile data only available if they purchase additional mobile data. Other techniques may be used for mobile data allocation. In either case, a user may benefit from managing the mobile data usage of applications in order to maximize their benefit from their mobile allocation.

Various techniques may be used to reduce the network data usage of applications and thereby conserve a user's mobile data allocation. A local gateway application may be installed on a user device. This local gateway application may operate as a hub for a user's network activity, managing that network activity on a user's behalf. In some cases, the local gateway application may only manage a user's network activity when on a network with a limited allocation, such as a cellular data network. In some cases, the local gateway application may always manage a user's network activity, though possibly with rules that differ based on whether or not a user's device is currently using a network with a limited data allocation.

One technique that may be applied is the conditional allowance and blocking of network communication by applications on a client device. A local gateway application may selectively control whether or not that network communication is allowed so as to reduce network usage by blocking a portion of attempted network usage. The local gateway application may apply this control on a per-application basis, identifying the application associated with the network communication and applying rules to that network communication that indicate allowance or blocking based on the identified application. This allowance or blocking may be further controlled based on additional criteria. For instance, an application may be allocated an allowance of network data usage, either as an absolute amount or for a defined time period (e.g., daily, weekly, monthly). The application may be allowed to engage in network activity while that allowance of network data usage has not been extinguished and blocked from engaging in network usage once the application's allocation of network data usage has been completely used.

Additional techniques may be used to reduce the network data usage of applications. Access to media hosted on network devices may be mediated to reduce the bandwidth used in accessing the media. For instance, lower-quality media may be used. Images embedded in web pages may be recoded to reduce their size—such as by using a lower resolution, or using higher compression rates—with the reduced-size version of the image provided in providing the web page. Where multiple qualities of video are available, a lower-quality version of the video may be provided. Alternatively, a lower-quality version of the video may be generated and provided to the user as a replacement for an original-quality version. Compression may be applied to a network connection to reduce the network bandwidth used in sending data on and off a device. Other techniques may also be used.

Services may be provided in addition to those that reduce network data usage. Encryption may be applied to the data sent on and off a device. The use of encryption may protect the security and privacy of a user's network usage. Additional services may be provided by a local gateway application.

The services provided by a local gateway application may be provided through interoperation with one or more servers that proxy traffic, such as a virtual private network (VPN) server or hypertext transport protocol (HTTP) proxy server. The local gateway application may channel at least a portion of the network communication of a device through one or more proxy servers in order to provide services to the user of the device. The providing of encrypted communication, for instance, may be provided by encrypting the communication between the client device and a VPN server, with the VPN server decrypting the communication and engaging in unencrypted communication with the ultimate destination device that may not support encrypted communication. This may serve to protect the client's communication during a local portion of the network communication for a device. Similarly, compression may be applied by compressing the communication between the client device and the VPN server, with the VPN server decompressing the communication and engaging in uncompressed communication with the ultimate destination device that may not support compressed communication. This may serve to preserve bandwidth for the wireless data portion of the network communication, thereby conserving a user's mobile data allocation. Where lower-quality media is provided to a client device, an HTTP proxy server may be responsible for finding, providing, or generating the lower-quality media, so that the bandwidth is conserved in the portion of the network communication that uses the wireless communication of the client device.

As a result, the embodiments described herein can improve the affordability of using mobile data access, the scalability of a mobile data system, and the utility of a mobile data system for a user.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a dynamic local VPN system 100. In one embodiment, the dynamic local VPN system 100 may comprise a computer-implemented system having software applications comprising one or more components. Although the dynamic local VPN system 100 shown in FIG. 1 has a limited number of elements in a certain topology, it may be appreciated that the dynamic local VPN system 100 may include more or less elements in alternate topologies as desired for a given implementation.

A client device 120 may correspond to a mobile device, personal computer device, portable computer device, desktop computer device, tablet device, smartphone device, and/or any other form of computing device. A client device 120 may be associated with a particular user and access one or more data networks for use in communication. A client device 120 may execute an operating system 150, a local gateway application 140, and one or more local applications 130.

Local applications 130 may correspond to some or all of the applications installed, otherwise stored, or otherwise available for execution on a client device 120. The local applications 130 may include applications included with a client device 120 by the provider of a client device 120, reseller of a client device 120, provider of the operating system 150, provider of cellular service to a client device 120, or other entity configuring a client device 120 prior to distribution to its end user. The local applications 130 may include applications installed by a user of a client device 120. In some cases, a user may have installed one or more of the local applications 130 by downloading the applications from an application repository. The operating system 150 may comprise any known operating system, including the iOS® or Android® operating systems.

A local gateway application 140 may be present on a client device 120 to manage the operation of the client device 120 and its local applications 130. The local gateway application 130 may empower the client device 120 to use the VPN server 160 and/or HTTP proxy server 165 and to manage the interoperation of the local applications 130 with the VPN server 160 and/or HTTP proxy server 165.

Network traffic of the client device 120 that is exchanged via the VPN server 160 may be sent through the local gateway application 140. In some embodiments, all network traffic of the client device 120 may be exchanged via the local gateway application 140 to empower the local gateway application 140 to manage the network usage of the client device 120. The local gateway application 140 may empower a user of the client device 120 to configure permissions for local applications 130 to use one or more networks, to apply one or more rules to the network usage of the local applications, and generally to control their network usage. For example, a user may limit the usage of a cellular data service for network access in order to preserve a cellular data usage allocation or subscription, or to avoid facing overages of cellular network usage. The local gateway application 140 may also manipulate network traffic in order to improve network efficiency, to provide network security, and/or to provide other advantageous changes to network usage by the client device 120. For example, the local gateway application 140 may interoperate with a HTTP proxy service 165 to reduce the bandwidth used in transmitting images. In another example, the local gateway application 140 may interoperate with a VPN server 160 to reduce the number of network connections (e.g., transport control protocol/internet protocol (TCP/IP) connections) used in retrieving a web page. In another example, the local gateway application 140 may apply encryption to a network connection between the client device 120 and the VPN server 160 in order to prevent eavesdropping on a local network for the client device 120.

Exchanging network traffic via the local gateway application 140 may comprise using a network interface application programming interface (API) generally providing access to networks accessible to the client device 120. For instance, the client operating system (OS) of the client device 120 may automatically select a network interface from a plurality of network interfaces according to a priority of the network interfaces. In some embodiments, the local gateway application 140 may be registered as the highest-priority network interface of the plurality of network interfaces. The local gateway application 140 may be of a higher priority than a cellular network interface, but be of lower priority other network interfaces (e.g., a Wi-Fi network interface) access to which is not managed by the local gateway application 140. As such, in some cases, the local gateway application 140 and the VPN server 160 may only be used for network traffic when a Wi-Fi network and other networks of higher priority than the cellular network (and therefore the local gateway application 140) are not available to the client device 120. In some embodiments, local applications 130 using local gateway application 140 may first be registered with the client OS or local gateway application 140 before the local gateway application 140 is a prioritized network interface for the local applications 130. Users of a client device 120 may have to opt-in to a privacy policy associated with local gateway application 140 prior to local gateway application 140 being used as a network interface for local applications 130. In some embodiments, the local gateway application 140 may be registered as a virtual private network (VPN) service provider for the client device 120, and receive network traffic from local applications 130 based on being registered as the VPN service provider. The local gateway application 140 may, upon execution, register as the VPN service provider with the operating system 150. The local gateway application 140 may request permission from a user of the client device 120 to register as the VPN service provider prior to registering as the VPN service provider.

A client device 120 may communicate with other devices using one or more wired and wireless transmissions to exchange network traffic. Exchanging network traffic, such as may be included in the exchange of messaging transactions, may comprise transmitting and receiving network traffic via a network interface controller 125 (NIC). A NIC comprises a hardware component connecting a computer device, such as a client device, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller 125 may be used for the network activities of the embodiments described herein, including the interoperation of the local applications 130 and local gateway application 140.

A VPN server 160 may be interposed in a network between a client device 120 and a network server 170. A client device 120 may exchange network traffic with the network server 170, both sending data to and receiving data from a network server 170. The VPN server 160 may act as an intermediary between the client device 120 and the network server 170 for these exchanges. The VPN server 160 may exchange client traffic with the client device 120 and exchange server traffic with the network server 170 while acting as an intermediary. The local gateway application 140 may execute as a local application on the client device 120 to empower access to the VPN server 160. In some cases, such as for the handling and/or manipulating of HTTP traffic, the VPN server 160 may interoperate with an HTTP proxy server 165. In other cases, such as for non-HTTP application traffic, the VPN server 160 may interact directly with the network server 170 without the user of the HTTP proxy server 165. The local gateway application 140 may open a single VPN connection with the VPN server 160 for the communication of all traffic between the local gateway application 140 and the VPN server 160. The network connections for local applications may all be tunneled through this single VPN network connection.

A local application may engage in an application network connection 110. An application network connection 110 may comprise a TCP/IP connection or a user datagram protocol/internet protocol (UDP/IP) connection, without limitation. An application network connection 110 may be initiated by a local application and initially handled by the operating system 150, such as by a network library for the operating system 150. The operating system 150 may forward the application network connection 110 to the local gateway application 140 based on the local gateway application 140 being registered a VPN destination for the client device 120. The local gateway application 140 may receive the application network connection 110 and manage the application network connection 110. The management of the application network connection 110 may be based on one or more rules set by a user of the client device 120, which rules may be contingent on the identity of the local application, the identity of the destination network server 170, the current network being used by the client device 120, a data usage record for the local application, details of the application network connection 110, and/or other factors. In some cases, the local gateway application 140 may block the application network connection 110. In some cases, the local gateway application 140 may allow the application network connection 110 to engage with a network server 170 without the mediation of the VPN server 160. In some cases, the local gateway application 140 may redirect the application network connection 110 through a VPN server 160, allowing access to the network server 170 via the VPN server 160. Other network management techniques may be employed in addition or alternative.

Dynamic local VPN system 100 may include an authorization server (or other suitable component(s)) that allows users to opt in to or opt out of having their actions logged by dynamic local VPN system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the local gateway application 140 and/or VPN server 160 through blocking, data hashing, anonymization, or other suitable techniques as appropriate.

The local gateway application 140 may perform its functions in interoperation with an operating system 150 for the client device 120 upon which it executes. The local gateway application 140 may register as a virtual private network (VPN) service provider for the client device 120. The local gateway application 140 registering as the VPN service provider may result in the operating system 150 providing the local gateway application 140 with a VPN network interface from which it can read packets and to which it can write them to perform VPN service. The local gateway application 140 may use the network interface to retrieve packets from local applications 130. The local gateway application 140 may use the VPN network interface to send packets to the local applications 130. The local gateway application 140 may therefore receive some or all of the outgoing network traffic for the client device 120, thereby empowering the local gateway application 140 to manage the network traffic for local applications 140, such as for an application network connection 110.

The local gateway application 140 operating as a VPN service provider may determine the manner in which an application network connection 110 is received. The operating system may provide the application network connection 110 to the local gateway application 140 as a sequence of network packets, such as TCP/IP packets, retrieved using the VPN service provider network interface. Some of the modifications to an application network connection 110 may be simpler, more efficient, or otherwise better for a local gateway application 140 to perform by operating on network packets. For instance, encryption may be applied on a per-packet basis so that the decrypting by a VPN server 160 regenerates the sequence of network packets for interchange with the network server 170.

However, it may also be beneficial for the local gateway application 140 to be able to operate with the application network connection 110 as a network stream. Having the application network connection 110 pass through the local gateway application 140 as a network stream that uses the operating system 150 TCP/IP stack for the handling of TCP/IP semantics—for example, the exchange of synchronization (SYN), synchronization-acknowledgement (SYN-ACK), and acknowledgement (ACK) packets—may relieve the local gateway application of the burden of managing the state of the TCP/IP connection, placing that burden on the operating system 150 instead. By using the operating system 150 to manage the network stream, the local gateway application 140 may rely on a stable implementation of the network stack without having to duplicate its functionality.

As such, the local gateway application 140 may open a network socket and send the network packets for the application network connection 110 from the VPN network interface to the opened network socket via the operating system 150 by readdressing each packet retrieved as a result of being the registered VPN service provider to the destination socket and writing it to the VPN network interface. As the application network connection 110 is received at the receiving network socket as part of a normal network interaction, rather than as a result of the local gateway application 140 being a registered VPN service provider for the client device 120, the local gateway application 140 may be able to receive the application network connection 110 as a network stream. The local gateway application 140 may then redirect the application network connection 110 as the network stream, addressing it to the destination network server 170 or to the VPN server 160 as desired for the given application network connection 110.

Encryption may be applied to the application network connection 110 on a per-packet basis. As such, to generate a sequence of network packets out of the network stream, the network stream of the application network connection 110 may be looped back through the operating system 150. The network stream for the application network connection 110 may be sent from an unprotected network socket, with the use of an unprotected network socket (as compared to a protected network socket) allowing for the automatic redirection of the network stream to the local gateway application 140 due to it being the VPN service provider for the client device 120. The local gateway application 140 may therefore receive the application network connection 110 again as a sequence of network packets. The local gateway application 140 may recognize the application network connection 110 as being received from itself—and therefore being for sending off the client device 120—rather than from another local application by using a network connection registry. The local gateway application 140 may register the network socket used to transmit the network stream for the application network connection 110 in the network connection registry and recognize the application network connection 110 as being part of a network stream loop by the local gateway application 140 because the application network connection 110 is received from the registered network socket.

The network socket may be recognized based on the port associated with it. The local gateway application 140 may receive the application network connection 110 as a sequence of network packets from the operating system 150. The local gateway application 140 may then send the application network connection 110 to the network server 170 or VPN server 160 as the sequence of network packets. Where encrypted relay via the VPN server 160 is decided on for the application network connection 110, each of the network packets may be encrypted and then sent to the VPN server 160. The VPN server 160 may then decrypt each of the network packets and transmit them to the network server 170, thereby completing the connection between the local application and the network server 170. In some cases, such as for the handling of HTTP traffic, the HTTP proxy server 165 may be used to further relay to the network packets to the network server 170. Data sent from the network server 170 to the local application may follow the reverse path, passing the local gateway application 140 and operating system 150 in one or more loops before delivery to the local application. Similarly, compression may be applied on a per-packet basis before sending to the VPN server 160, and packets received from the VPN server 160 may be decompressed once received.

As a result, the local gateway application 140 may modify the application network connection 110 using both packet-based modifications and stream-based modifications. By modifying the application network connection 110 in the most appropriate form for each modification, the complexity of the local gateway application 140 may be reduced, thereby increasing its reliability and reducing the difficulty of its implementation.

Figure 2:
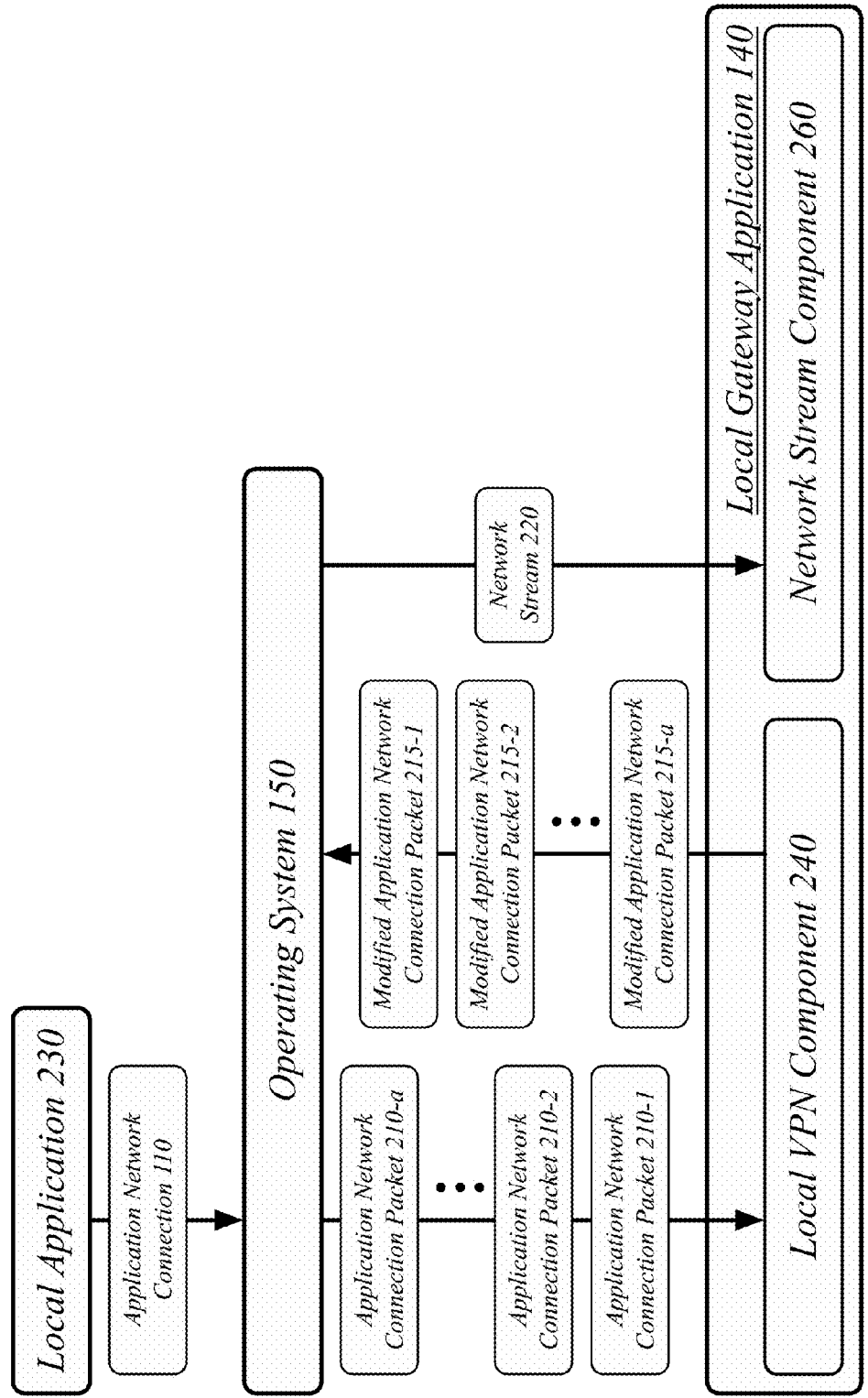
FIG. 2 illustrates an embodiment of the dynamic local VPN system using an operating system to convert a network connection to a network stream.

FIG. 2 illustrates an embodiment of the dynamic local VPN system 100 using an operating system 150 to convert an application network connection 110 to a network stream 220.

The local gateway application 140 may comprise one or more components. The one or more components may comprise software components of a software application. The local gateway application 140 may comprise a local VPN component 240 and a network stream component 360. The local VPN component 240 may be generally arranged to operate on application connections from local applications 130 forwarded by the operating system 150 for a client device 120. The network stream component 260 may be generally arranged to operate on network streams for local applications 130 to manage network connection characteristics using network stream semantics.

A local application 230 of a plurality of local applications 130 may engage in an application network connection 110. The local application 230 may request to the operating system 150 that an application network connection 110 be opened to a destination network server 170. The local application 230 may open a network socket on the client device 120 and engage in the application network connection 110 from a local TCP/IP port. The operating system 150 may receive the request to engage in the application network connection 110 from the local application 230 and carry out network tasks for the performance of the application network connection 110 on behalf of the local application 230.

The application network connection 110 may comprise a plurality of application network connection packets 210. The local application 230 may send data via a network socket using stream semantics. The operating system 150 may construct network packets, such as TCP/IP packets, encapsulating the sent data from the local application 230. The operating system 150 may submit the application network connection packets 210 to the local gateway application 140 based on the local gateway application 140, or specifically a local VPN component 240, being registered as a VPN service provider with the operating system 150.

The local VPN component 240 may receive the application network connection 110 from a local application 230 on a client device 120 via the operating system 150. The application network connection 110 may be received as a plurality of application network connection packets 210. The application network connection packets 210 may be received in sequence from the operating system 150. The plurality of application network connection packets 210 may be received from the operating system 150 based on a registration of the local VPN component 240 as a VPN service provider with the operating system 150 for the client device 120.

The local VPN component 240 may modify the plurality of application network connection packets 210 for resending through the operating system 150. Modifying the plurality of application network connection packets 210 may comprise modifying a destination network address for each of the plurality of application network connection packets 210 to a network address available to the local gateway application 140 so that the local gateway application 140 receives the application data within the application network connection packets 210 as a network stream.

The local VPN component 240 may then send the plurality of application network connection packets 210 through the operating system 150 to generate the network stream 220 by writing the application network connection packets 210 to the VPN network interface provided by the operating system 150. The application network connection packets 210 may be sent as modified application network connection packets 215 with a replaced destination network address, such as a replaced IP address and destination network port, with the replaced IP address being local or otherwise assigned to the client device 120, with the destination network port also assigned to the local gateway application 140, thereby empowering the local gateway application to re-receive the application network connection 110, this time as a network stream 220.

The network stream component 260 may open a network socket to receive the application network connection 110 as a network stream 220 from the operating system 150. The networks stream component 260 may receive the network stream 220 at the second network socket.

Figure 3:
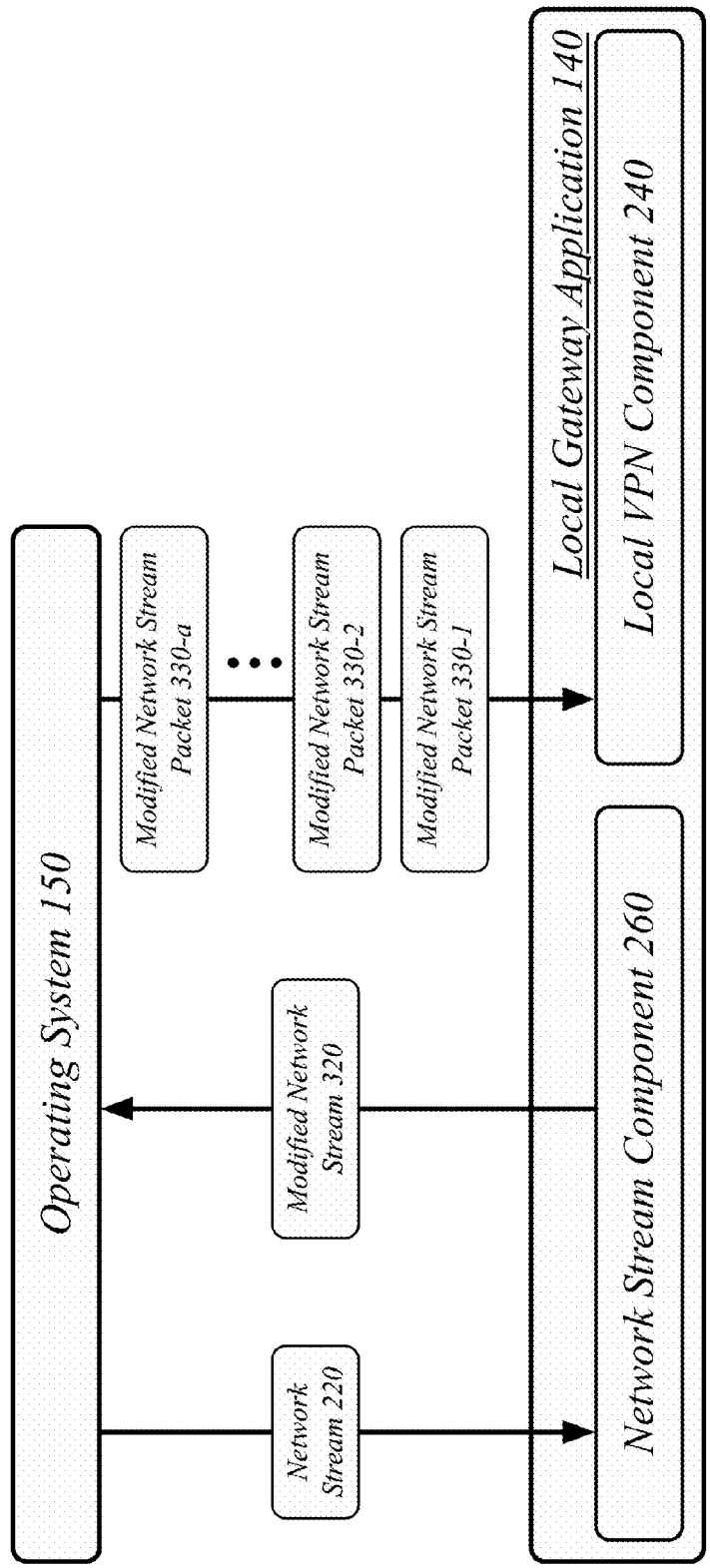
FIG. 3 illustrates an embodiment of the dynamic local VPN system using an operating system to packetize a network stream.

FIG. 3 illustrates an embodiment of the dynamic local VPN system 100 using an operating system 150 to packetize a network stream 220.

The network stream component 260 may receive the network stream 220, the network stream 220 associated with a local application 230 on the client device 120. The network stream component 260 may modify the network stream 220 to generate a modified network stream 320. The network stream component 260 may send the modified network stream 320 through an operating system 150 for the client device 120 to generate a plurality of modified network stream packets 330. The local gateway application 140 may generate the plurality of modified network stream packets 330 to empower the local gateway application 140 to perform packet-level adjustments prior to sending the VPN network connection packets 330 to a network server 170 or VPN server 160. The local gateway application 140 may retrieve each of the modified network stream packets 330 using the VPN network interface provided to the local gateway application 140 due to the local gateway application 140 being the VPN service provider for the client device 120.

Modifying the network stream 220 may comprise assigning a destination network address to the network stream 220. The modified network stream 320 may be assigned a destination network address for the network server 170, or other network destination, corresponding to the destination requested by the local application 230. The local gateway application 140 may maintain a network connection registry tracking the destination address for network connections, with the local VPN component 240 recording the destination network address for the application network connection 110 and the network stream component 260 using the network connection registry to assign the destination network address. Where the modified network stream 320 is to be sent via the VPN server 160, the modified network stream 320 may still be assigned the destination network address for the network server 170, with the modified network stream 320 tunneled to the VPN server 160 for delivery to the network server 170 via a VPN connection between the client device 120 and the VPN server 160.

Modifying the network stream 220 may comprise making one or more changes to the application data transmitted via the application network connection 110. For instance, an application network connection 110 may comprise a hypertext transport protocol (HTTP) connection. The network stream component 260 may modify the network stream 220 to reduce bandwidth consumption for the HTTP connection. The network stream component 260 may, for example, replace references to media content, such as images, with references to versions of the media content using less bandwidth.

The operating system 150 may be arranged to determine whether the local gateway application 140 and local VPN component 240 receive network connections based on whether the network socket used to perform the network connection is protected or unprotected. Protected network sockets may bypass VPN settings for the operating system 150 and thereby cause a network connection to bypass the local gateway application 140. Unprotected network sockets may be subject to VPN settings for the operating system 150 and thereby cause a network connection to be passed to the local gateway application 140. The local gateway application 140 may therefore use protected network sockets to send data off the client device 120 and use unprotected network sockets to loop data through the operating system 150, such as to convert a network stream to network packets.

As such, sending the modified network stream 320 through the operating system 150 to generate the plurality of modified network stream packets 330 may use an unprotected network socket so as to empower the local VPN component 240 to receive the modified network stream packets 330. If a protected network socket were used, the modified network stream 320 would instead be sent off the client device 120, thereby denying the local gateway application 140 the opportunity to make packet-level modifications to the modified network stream packets 330. The plurality of modified network stream packets 330 are received from the operating system 150 based on the registration of a local VPN component 240 as a VPN service provider with the operating system 150, which would not occur if a protected network socket were used by the network stream component 260 for sending the modified network stream 320.

The local VPN component 240 may maintain a network connection registry to identify incoming network connections. In particular, the network connection registry may be used to identify when an incoming network connection is a network stream that has been looped through the operating system 150 to generate network packets, such that the network packets should be sent off the client device 120 to a remote destination, possibly after applying one or more modifications.

An application network connection 110 may be subject to one or more network connection policies. A user may set one or more rules for local applications 130 that define network connection policies for the management and/or modification of network connections. Network connection policies may specify how an application network connection 110 should be managed and/or modified.

A network connection policy may indicate proxy relay via a VPN server 160. The proxy network address may comprise an internet protocol (IP) address and a port for the VPN connection established between the local gateway application 140 and the VPN server 160. The network stream component 260 may register an unprotected network socket with a network connection registry for sending to the VPN server 160. The local VPN component 240 may therefore be informed, via the network connection registry, that the incoming modified network stream packets 330 should be sent to the VPN server 160 by identifying that they are received via the operating system 150 from the registered unprotected network socket.

Figure 4:
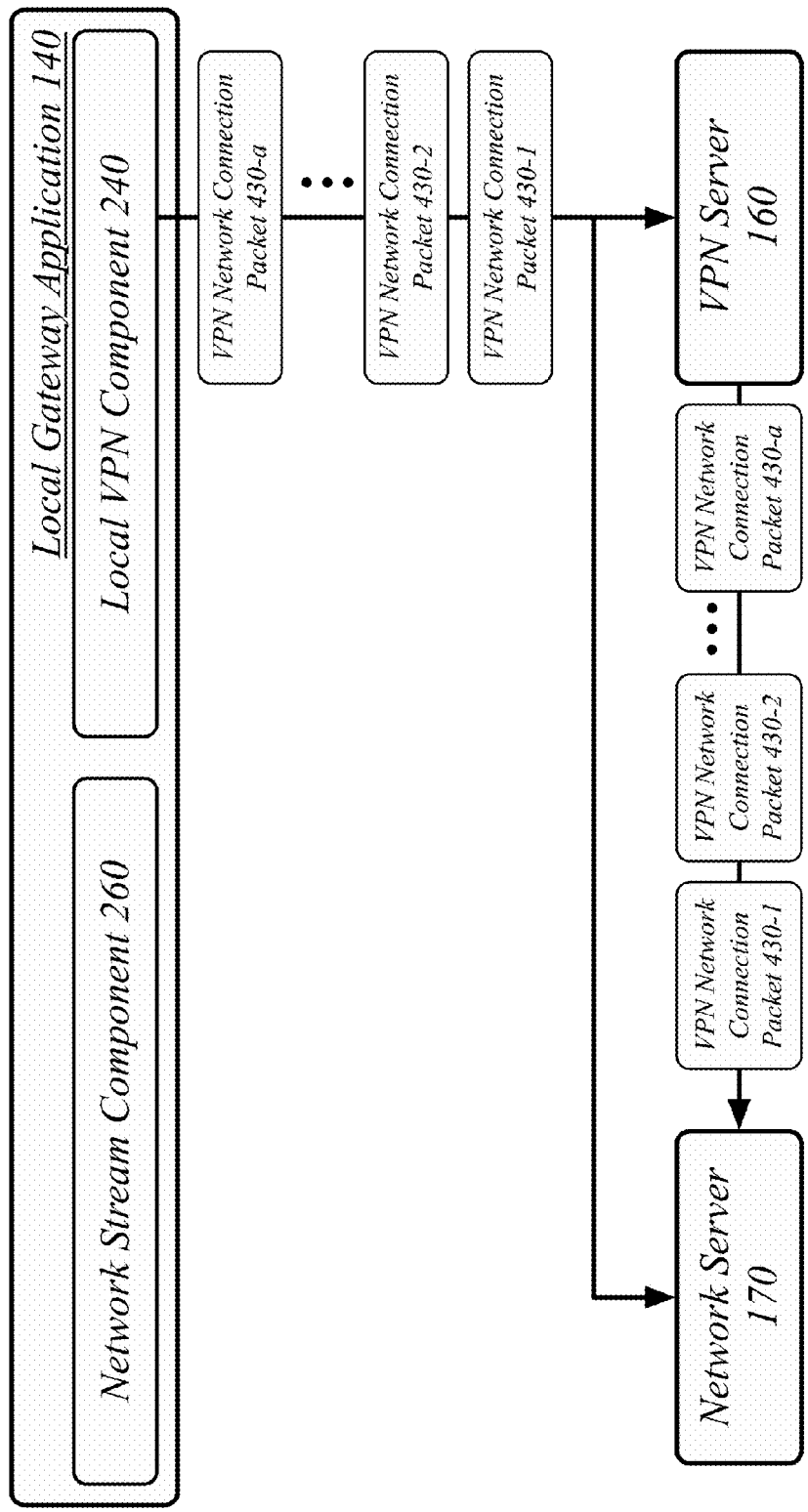
FIG. 4 illustrates an embodiment of the dynamic local VPN system sending VPN network connection packets to a network server.

FIG. 4 illustrates an embodiment of the dynamic local VPN system 100 sending VPN network connection packets 430 to a network server 170.

An application network connection 110 may be subject to one or more network connection policies. The local VPN component 240 may determine a network connection policy based on the local application 230 associated with the application network connection 110 and, therefore, the plurality of modified network stream packets 330. The local VPN component 240 may apply the network connection policy to its handling of the modified network stream packets 330.

The local VPN component 240 may modify the modified network stream packets 330 to generate a plurality of VPN network connection packets 430. The local VPN component 240 may then send the plurality of VPN network connection packets 430 to a destination network address when the network connection policy indicates sending. In some cases, the destination network address may correspond to a VPN server 160. The modified network stream packets 330 may be sent to the VPN server 160 at a destination network address for the VPN server 160 via an established VPN network connection with the VPN server 160, with the modified network stream packets 330 still being assigned a network address for the network server 170 for ultimate delivery to the network server 170. In some cases, the destination network address may correspond to a network server 170. In general, the destination network address may correspond to any type of network-accessible system or device. A network connection policy that indicates sending may include additional specifications, such as for the application of encryption. Sending the plurality of VPN network connection packets 430 to the destination network address may use a protected network socket to avoid having the VPN network connection packets 430 be redirected by the operating system 150 back to the local gateway application 140.

The local VPN component 240 may block the resending of the plurality of modified network stream packets 330 as VPN network connection packets 430 when the network connection policy indicates blocking. In some cases, blocking may be indicated based on a user setting a rule that an application is forbidden from using network data. Such a rule may be specific to networks with a specified or limited bandwidth allocation, so that the application is allowed to use network data when on a network without a network usage limit (e.g., a Wi-Fi network), but not allowed to use network data when on a network with a network usage limit (e.g., a cellular data network).

In some cases, applications may be assigned a data usage limit. This data usage limited may be a global limit, applied to all network usage by the application. Alternatively, this data usage limit may be a network-type-specific limit, applied to network usage by the application when on a network with a network usage limit, such as a cellular data network. The data usage limit may be specified by a rule set by a user of the client device 120. The data usage limit may be specific to a particular time period (e.g., a day, a week, a month), with the data usage accumulated during that time reset for the next time period. The local VPN component 240 may maintain a data usage record for each of the local applications 130 that engage in network activity, including the local application 230 associated with the application network connection 110. The data usage record may tabulate, record, or otherwise track the data usage for each local application that engages in network activity. The data usage record may specifically track the data usage of local applications 130 on networks with a network usage limit or allocation, such as cellular data networks.

The local VPN component 240 may track whether requested network usage for an application exceeds an assigned data usage limit. The local VPN component 240 may block the sending of the network data for the application network connection 110 based on the local application 230 exceeding a data usage limit. Blocking the sending of the network data may comprise refraining from sending VPN network connection packets 430. Alternatively, blocking the sending of the network data may be performed earlier in the process by refraining from sending the application network connection packets 210 or network stream. The local application 230 may perceive that it has no network connectivity based on a failure of the network server 170 to respond to the application network connection 110 (as the network server 170 doesn't receive the application network connection 110). In some cases, where the assigned data usage limit is reached during the activity of an application network connection 110, the local application 230 may experience the limit being reached as a failure of the application network connection 110.

A network connection policy may indicate encrypted proxy relay via a VPN server 160. In these cases, the local VPN component 240 may encrypt the plurality of modified network stream packets 330 to generate the plurality of VPN network connection packets 430 for sending to the destination network address for the VPN server 160. The VPN network connection packets 430 may comprise an encapsulation of an encryption of the modified network stream packets 330. The encryption of the modified network stream packets 330 may use encryption techniques. The encryption of the modified network stream packets 330 may use encryption techniques for the encryption of network packets, such as may be supported by a VPN server 160.

The network connection registry may be used to determine that the modified network stream packets 330 are for sending off of the client device 120. The local VPN component 240 may identify the plurality of modified network stream packets 330 for sending to the VPN server 160 based on receiving the plurality of modified network stream packets 330 from an unprotected network socket registered in the network connection registry via the operating system 150.

Figure 5:
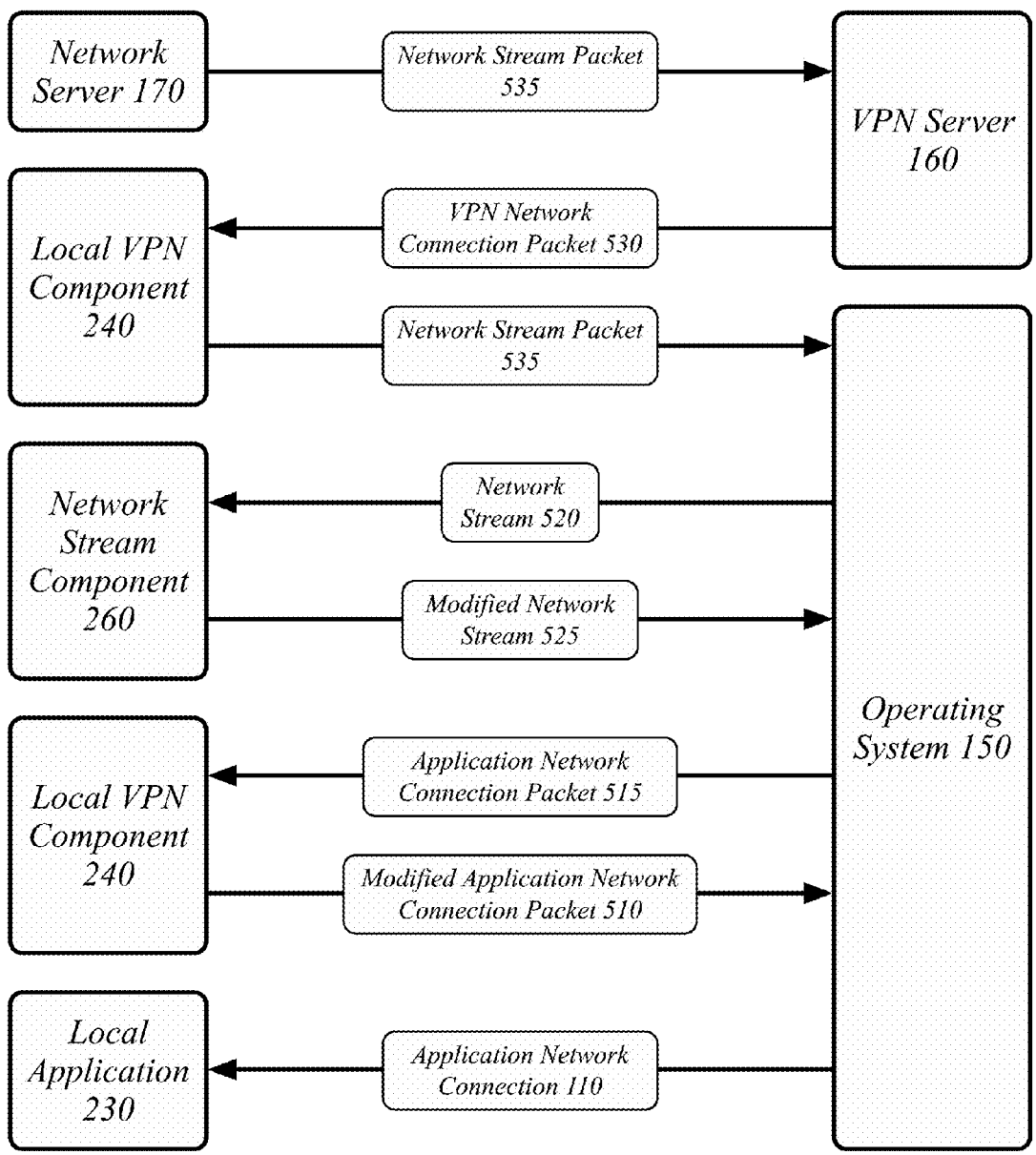
FIG. 5 illustrates an embodiment of the dynamic local VPN system processing a reply from a network server.

FIG. 5 illustrates an embodiment of the dynamic local VPN system 100 processing a reply from a network server 170.

The application network connection 110 with a network server 170, or other destination network device, may comprise two-way communication. This two-way communication may include both the receipt of data content from the network server 170 (e.g., the contents of a web page hosted by the network server 170) and network protocol data, such as SYN-ACK packets for TCP/IP communication. The data sent from the network server 170 may follow a reverse path from the data sent by the local application 230 to the network server 170.

The network server 170 may send a network stream packet 535 to the VPN server 160, the network stream packet 535 sent as part of the network connection between the VPN server 160 and the network server 170. The VPN server 160 may then encapsulate the network stream packet 530 in a VPN network connection packet 530 and send the VPN network connection packet 530 to the local VPN component 240. In some cases, the VPN server 160 may modify the network stream packet 535 prior to encapsulating and sending it to the local VPN connection 240, such as by encrypting it. In some embodiments, the VPN server 160 may de-packetize the network connection between the VPN server 160 and the network server 170 and generate and send a different network packet to the local VPN component 240. In cases in which the VPN server 160 isn't used by the local gateway application 140, the network stream packet 530 may be sent directly to the local VPN component 240.

The local VPN component 240 may receive a VPN network connection packet 530 at the network socket used for the network connection between it and the VPN server 160. Where the VPN server 160 is not used, the local VPN component 240 may receive a VPN network connection packet 530 at the network socket used for the network connection between it and the network server 170 or another network device. It will be appreciated that the local VPN component 240 receiving the VPN network connection packet 530 may be mediated by the operating system 150 as the operating system 150 may manage all network activity on a client device 120. The illustration of the operating system 150 performing various operations may correspond to specific uses of the operating system 150 to achieve specific transformations of the application network connection 110 and not every instance in which the operating system 150 is involved in a process.

The local VPN component 240 may extract the network stream packet 535 from the VPN network connection packet 530 and send the network stream packet 535 back though the operating system to generate a network stream 520, corresponding to the reverse communication path as the modified network stream 320 as described with reference to FIG. 3. Passing the network stream packet 535 back though the operating system may allow the local gateway application 140 to use the operating system 150 to perform the synchronization-acknowledgement function, to perform rate control, and/or other network protocol functions. The local VPN component 240 may decrypt the network stream packet 535 prior to submitting it to the operating system 150.

The local VPN component may modify the network stream 520 to generate a modified network stream 525, which may then submitted to the operating system 150 using the same unprotected network socket used to receive the network stream 220 as described with reference to FIG. 3. The modified network stream 525 may be modified to redirect the communication to the local application 230, though the network data may still make another pass through the local gateway application 140 before being sent to the local application 230. The operating system 150 may then provide an application network connection packet 515 to the local VPN component 240, the application network connection packet 515 comprising the contents of the modified network stream 525. That application network connection 515 may be modified to generate a modified application network connection packet 510. The modified application network connection packet 510 may be constructed to have, for instance, modified headers so as to operate as a reply to the application network connection packets 210 described with reference to FIG. 2.

The modified application network connection packet 510 may be sent to the local application 230 via the operating system 150 as part of the operation of the local VPN component 240 and local gateway application 140 as a VPN service provider for the client device 120. The operating system 150 may then pass the data for the modified application network connection packet 510 through its performance of the application network connection 110. As such, the local application 230 may be empowered to communicate with a network server 170 or other network device with the local gateway application 140 as an intermediary.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6A illustrates one embodiment of a first portion of a logic flow 600. The logic flow 600 may be representative of some or all of the operations executed by one or more embodiments described herein.

In the illustrated embodiment shown in FIG. 6, the logic flow 600 may receive an application network connection from the application on the device, the application network connection received as a plurality of application network connection packets at block 602.

The logic flow 600 may modify the plurality of application network connection packets for resending through the operating system at block 604.

The logic flow 600 may send the plurality of application network connection packets through the operating system to generate a network stream at block 606.

The logic flow 600 may receive the network stream, the network stream associated with an application on a device at block 608.

The logic flow 600 may continue past block A as described with reference to FIG. 6B.

Figure 6B:
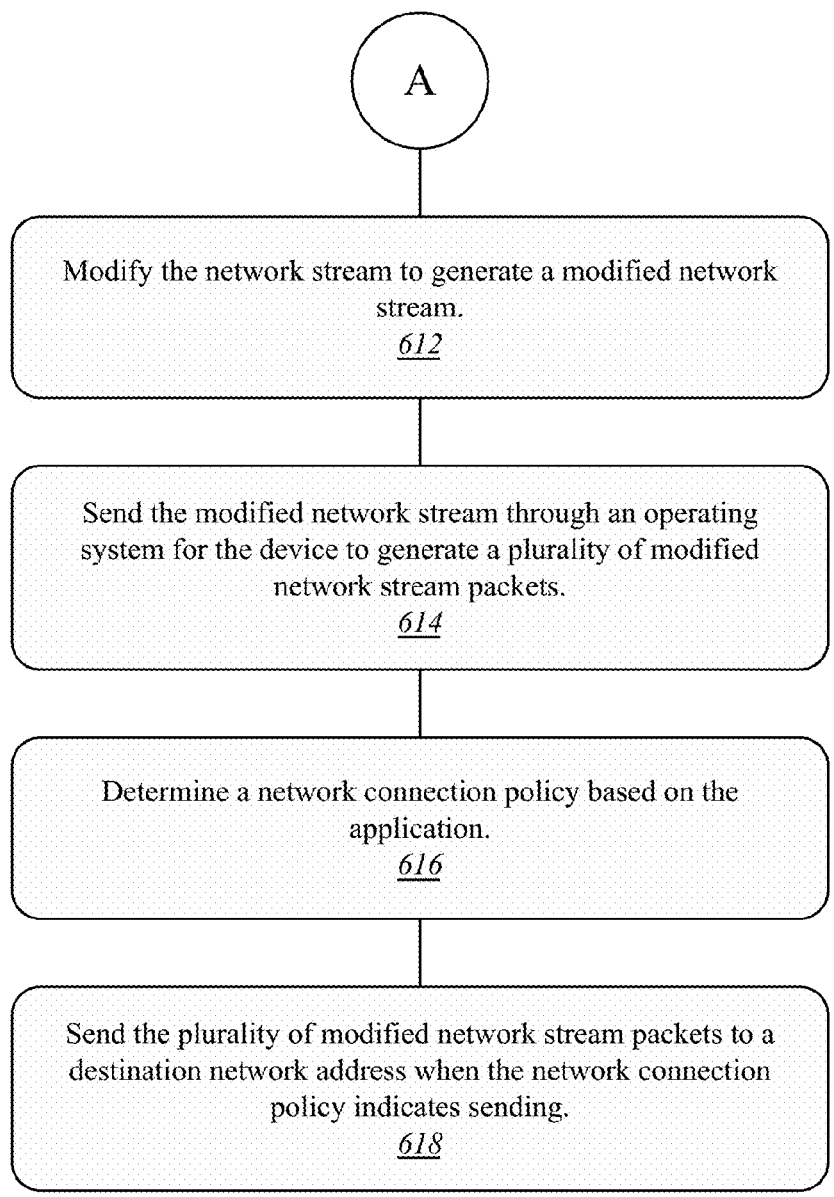
FIG. 6B illustrates an embodiment of a second portion of a logic flow for the system of FIG. 1.

FIG. 6B illustrates one embodiment of a second portion of a logic flow 610. The logic flow 610 may be representative of some or all of the operations executed by one or more embodiments described herein. The logic flow 610 may be representative of a continuation of the logic flow of FIG. 6A. The logic flow 610 may continue from block A of logic flow 600 to block 612 of logic flow 610.

In the illustrated embodiment shown in FIG. 6B, the logic flow 610 may modify the network stream to generate a modified network stream at block 612.

The logic flow 610 may send the modified network stream through an operating system for the device to generate a plurality of modified network stream packets at block 614.

The logic flow 610 may determine a network connection policy based on the application at block 616.

The logic flow 610 may send the plurality of modified network stream packets to a destination network address when the network connection policy indicates sending at block 618.

The embodiments are not limited to these examples.

Figure 7:
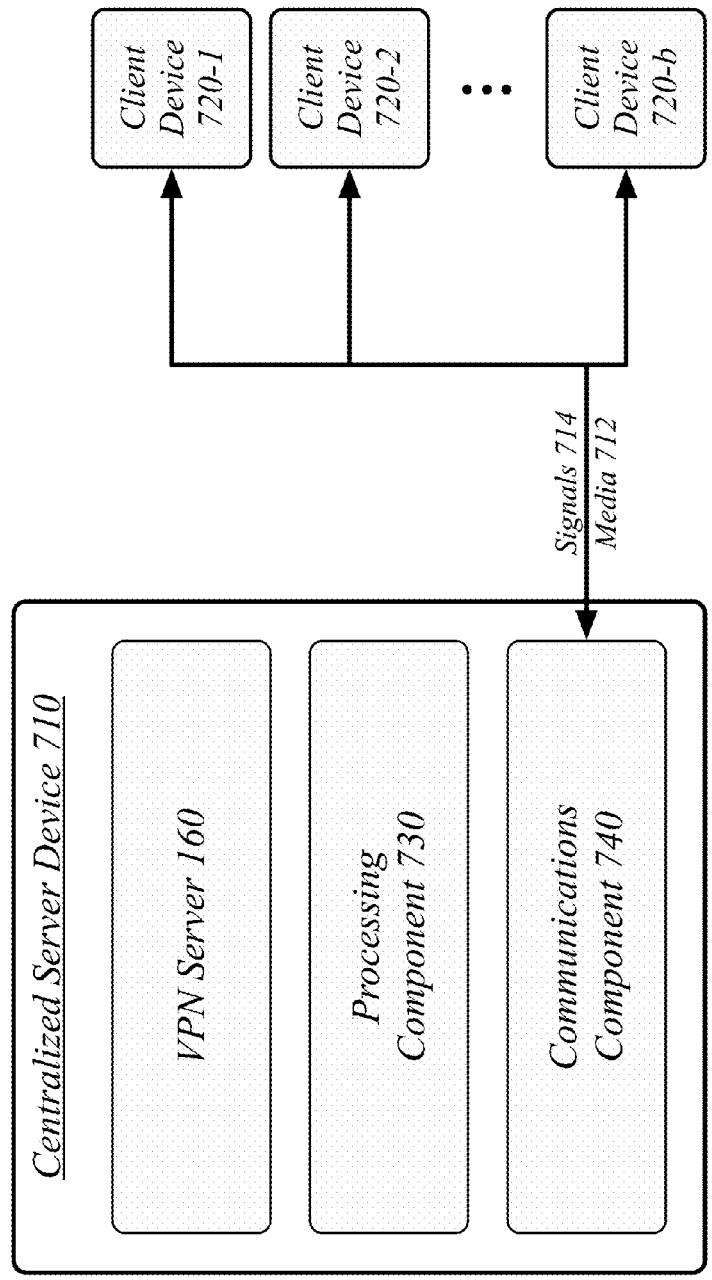
FIG. 7 illustrates an embodiment of a centralized system for the system of FIG. 1.

FIG. 7 illustrates a block diagram of a centralized system 700. The centralized system 700 may implement some or all of the structure and/or operations for the dynamic local VPN system 100 in a single computing entity, such as entirely within a single centralized server device 720.

The centralized server device 720 may comprise any electronic device capable of receiving, processing, and sending information for the dynamic local VPN system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 720 may execute processing operations or logic for the dynamic local VPN system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 720 may execute communications operations or logic for the dynamic local VPN system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 720 may communicate with client devices 720 over a communications media 712 using communications signals 714 via the communications component 740. The centralized server device 720 may implement a VPN server 160. The VPN server 160 may receive and forward network communication for a plurality of client devices 720.

Figure 8:
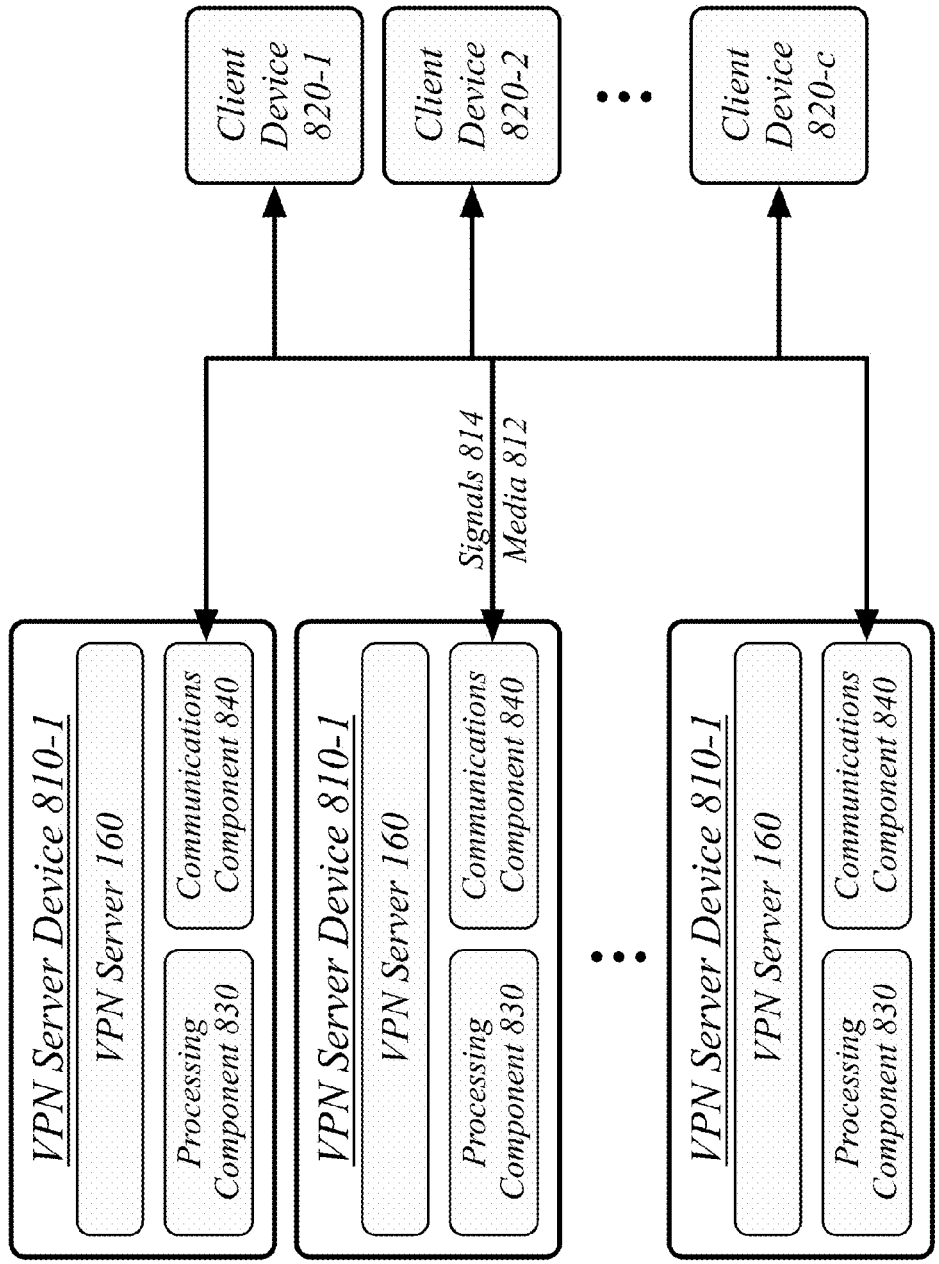
FIG. 8 illustrates an embodiment of a distributed system for the system of FIG. 1.

FIG. 8 illustrates a block diagram of a distributed system 800. The distributed system 800 may distribute portions of the structure and/or operations for the dynamic local VPN system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a plurality of VPN server devices 810. In general, the VPN server devices 810 may be the same or similar to the centralized server device 720 as described with reference to FIG. 7. For instance, the VPN server devices 810 may each comprise a processing component 830 and a communications component 840 which are the same or similar to the processing component 730 and the communications component 740, respectively, as described with reference to FIG. 7. In another example, the VPN server devices 810 may communicate over a communications media 812 using communications signals 814 via the communications components 840. Similarly, the distributed system 800 may comprise a plurality of client devices 820. The client devices may each comprise a processing component and a communications component, which are the same or similar to the processing component 730 and communications component 740, respectively, as described with reference to FIG. 7.

The VPN server devices 810 may comprise or employ one or more programs that operate to perform various methodologies in accordance with the described embodiments. In one embodiment, for example, the VPN server device 810 may each implement a VPN server 160. Each of the instances of the VPN server 160 may receive and forward network communication for a plurality of client devices 820.

Figure 9:
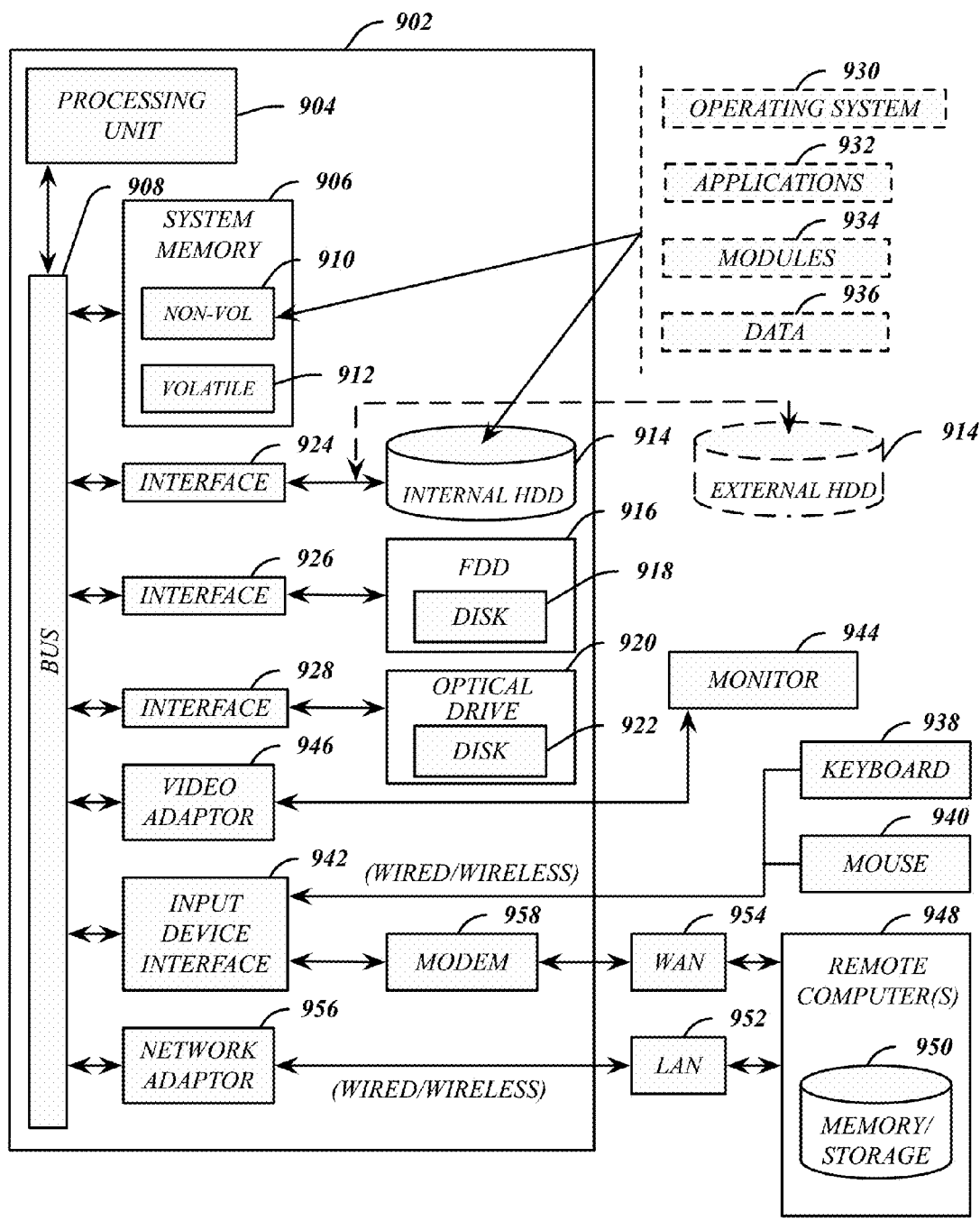
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 7, 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the dynamic local VPN system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.9 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.9x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
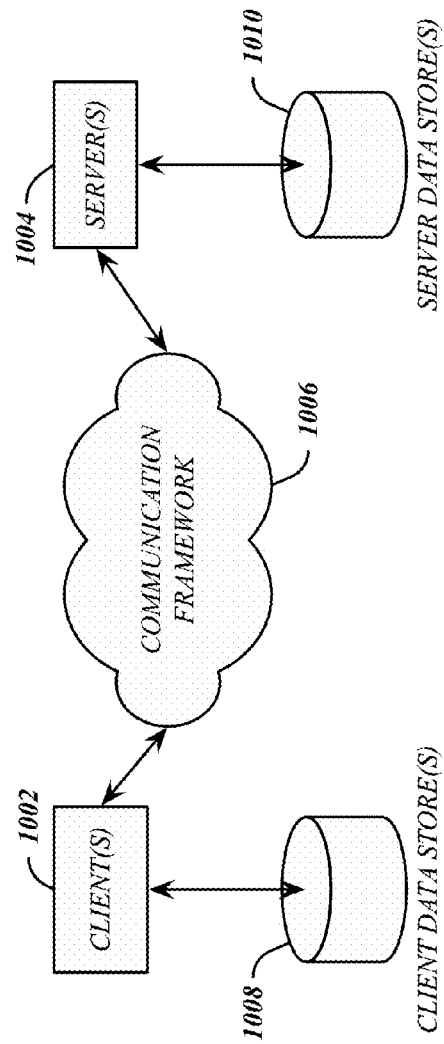
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the client devices 120, 720, 820. The servers 1004 may implement the centralized server device 710 and/or VPN server devices 810. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
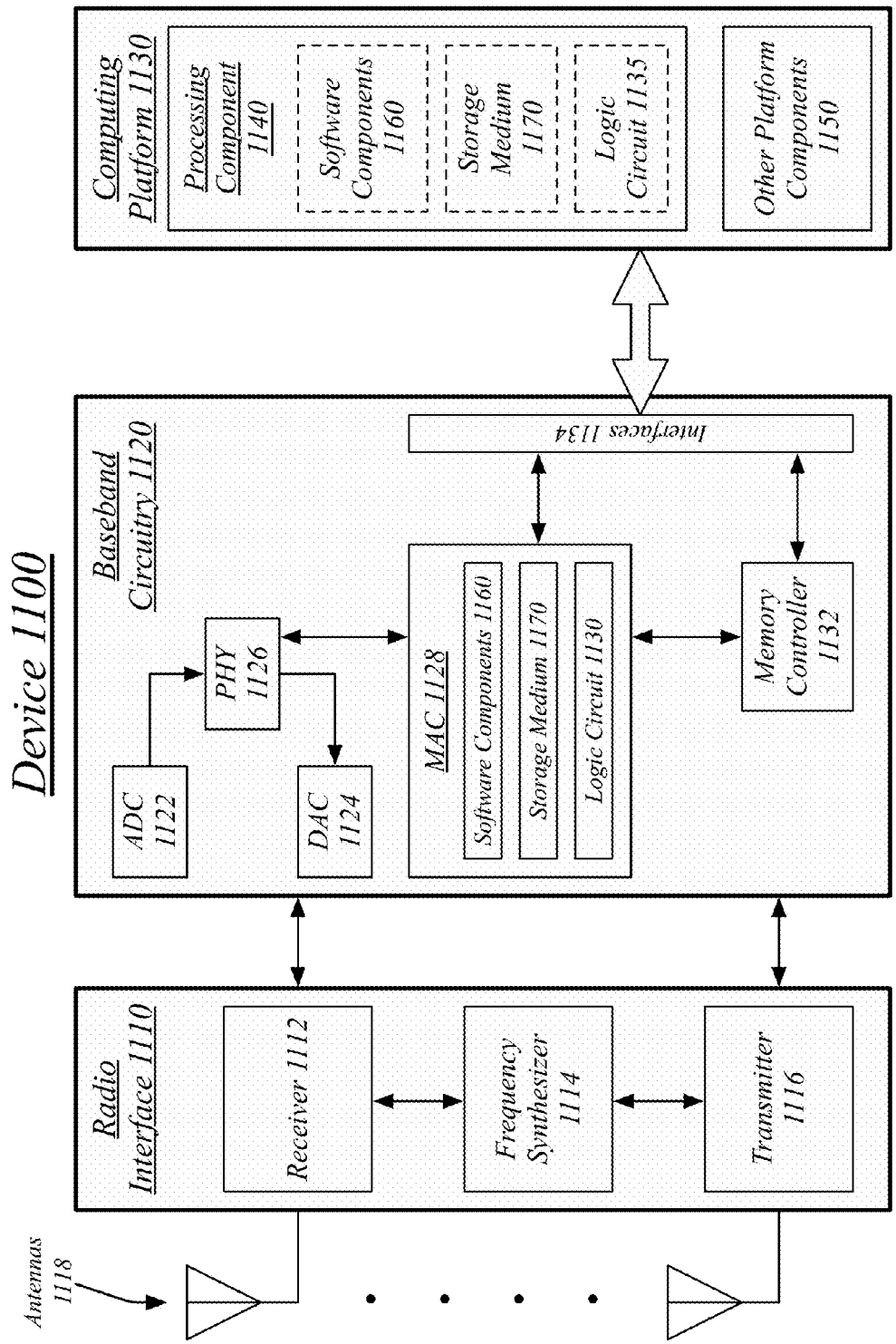
FIG. 11 illustrates an embodiment of a radio device architecture.

FIG. 11 illustrates an embodiment of a device 1100 for use in a multicarrier OFDM system, such as the dynamic local VPN system 100. Device 1100 may implement, for example, software components 1160 as described with reference to dynamic local VPN system 100 and/or a logic circuit 1135. The logic circuit 1135 may include physical circuits to perform operations described for the dynamic local VPN system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the dynamic local VPN system 100 and/or logic circuit 1135 in a single computing entity, such as entirely within a single device. Alternatively, the device 1100 may distribute portions of the structure and/or operations for the dynamic local VPN system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the dynamic local VPN system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a network stream, the network stream associated with an application on a device; modifying the network stream to generate a modified network stream; sending the modified network stream through an operating system for the device to generate a plurality of modified network stream packets; determining a network connection policy based on the application; and sending the plurality of modified network stream packets to a destination network address when the network connection policy indicates sending.

A computer-implemented method may further comprise receiving an application network connection from the application on the device, the application network connection received as a plurality of application network connection packets; modifying the plurality of application network connection packets for resending through the operating system; and sending the plurality of application network connection packets through the operating system to generate the network stream.

A computer-implemented method may further comprise the application network connection comprising a hypertext transport protocol connection, further comprising: modifying the network stream to reduce bandwidth consumption for the hypertext transport protocol connection.

A computer-implemented method may further comprise the network connection policy indicating encrypted proxy relay via a VPN server, further comprising: encrypting the plurality of modified network stream packets to generate a plurality of encrypted modified network stream packets; encapsulating the plurality of encrypted modified network stream packets in a plurality of VPN network connection packets; and sending the plurality of modified network stream packets to the destination network address within the plurality of VPN network connection packets.

A computer-implemented method may further comprise wherein sending the modified network stream through the operating system to generate the plurality of modified network stream packets uses an unprotected network socket, wherein sending the plurality of modified network stream packets to the destination network address uses a protected network socket, wherein the plurality of modified network stream packets are received from the operating system based on a registration of a local virtual private network component as a virtual private network service provider with the operating system for the device.

A computer-implemented method may further comprise the network connection policy indicating proxy relay via a VPN server, further comprising: registering an unprotected network socket with a network connection registry for sending to the VPN server; and identifying the plurality of modified network stream packets for sending to the VPN server based on receiving the plurality of modified network stream packets from the unprotected network socket via the operating system.

A computer-implemented method may further comprise blocking the sending of the plurality of modified network stream packets when the network connection policy indicates blocking.

A computer-implemented method may further comprise maintaining a data usage record for the application; and blocking the sending of the network data based on the application exceeding a data usage limit.

An apparatus may comprise a processor circuit on a device; a network interface controller communicatively coupled to the processor circuit; a network stream component operative on the processor circuit to: receive a network stream, the network stream associated with an application on a device; modify the network stream to generate a modified network stream; and send the modified network stream through an operating system for the device; and a local virtual private network component operative on the processor circuit to: receive the modified network stream from the operating system as a plurality of VPN network connection packets; determine a network connection policy based on the application; and send the plurality of VPN network connection packets to a destination network address via the network interface controller when the network connection policy indicates sending. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
receiving a network stream at a local gateway application on a device, the network stream associated with an application separate from the local gateway application on the device;
modifying the network stream to generate a modified network stream;
sending the modified network stream to an operating system on the device via an unprotected network socket, the operating system generating a plurality of modified network stream packets from the modified network stream;
receiving the plurality of modified network stream packets from the operating system;
making packet-level modifications to one or more of the modified network stream packets;
determining a network connection policy based on the application;
sending the plurality of modified network stream packets to a destination network address via a protected network socket when the network connection policy indicates sending;
receiving an application network connection from the application on the device, the application network connection received as a plurality of application network connection packets;
modifying the plurality of application network connection packets for resending through the operating system; and
sending the plurality of application network connection packets through the operating system to generate the network stream.

2. The method of claim 1, the application network connection comprising a hypertext transport protocol connection, further comprising:
modifying the network stream to reduce bandwidth consumption for the hypertext transport protocol connection.

3. The method of claim 1, the network connection policy indicating encrypted proxy relay via a VPN server, further comprising:
encrypting the plurality of modified network stream packets to generate a plurality of encrypted modified network stream packets;
encapsulating the plurality of encrypted modified network stream packets in a plurality of VPN network connection packets; and
sending the plurality of modified network stream packets to the destination network address within the plurality of VPN network connection packets.

4. The method of claim 1, wherein the plurality of modified network stream packets are received from the operating system based on a registration of a local virtual private network component as a virtual private network service provider with the operating system for the device.

5. The method of claim 1, the network connection policy indicating proxy relay via a VPN server, further comprising:
registering an unprotected network socket with a network connection registry for sending to the VPN server; and
identifying the plurality of modified network stream packets for sending to the VPN server based on receiving the plurality of modified network stream packets from the unprotected network socket via the operating system.

6. The method of claim 1, comprising:
blocking the sending of the plurality of modified network stream packets when the network connection policy indicates blocking.

7. The method of claim 6, comprising:
maintaining a data usage record for the application; and
blocking the sending of the network data based on the application exceeding a data usage limit.

8. An apparatus, comprising:
a processor circuit on a device;
a network interface controller communicatively coupled to the processor circuit;
a non-transitory computer readable storage medium storing instructions for execution on the processor, the instructions configured to:
receive a network stream at a local gateway application on a device, the network stream associated with an application separate from the local gateway application on the device;
modify the network stream to generate a modified network stream;
send the modified network stream to an operating system on the device via an unprotected network socket, the operating system generating a plurality of modified network stream packets from the operating system;
receive the plurality of modified network stream packets from the operating system;
make packet-level modifications to one or more of the modified network stream packets;
determine a network connection policy based on the application;
send the plurality of modified network stream packets to a destination network address via a protected network socket when the network connection policy indicates sending;
receive an application network connection from the application on the device based on the local virtual private network component being registered as the virtual private network service provider with the operating system for the device, the application network connection received as a plurality of application network connection packets;
modify the plurality of application network connection packets for resending through the operating system; and
send the plurality of application network connection packets through the operating system to generate the network stream.

9. The apparatus of claim 8, the application network connection comprising a hypertext transport protocol connection, the instructions further configured to:
modify the network stream to reduce bandwidth consumption for the hypertext transport protocol connection.

10. The apparatus of claim 8, the network connection policy indicating encrypted proxy relay via a VPN server, the instructions further configured to:
register the unprotected network socket with a network connection registry for sending to the VPN server;
identify the plurality of modified network stream packets for sending to the VPN server based on receiving the plurality of modified network stream packets from the unprotected network socket via the operating system; and
encrypt the plurality of modified network stream packets prior to sending the plurality of modified network stream packets to the destination network address for the VPN server encapsulated within a plurality of VPN network connection packets.

11. The apparatus of claim 8, wherein the plurality of modified network stream packets are received from the operating system based on a registration of a local virtual private network component as a virtual private network service provider with the operating system for the device.

12. The apparatus of claim 8, the instructions further configured to:
   block the sending of the plurality of modified network stream packets when the network connection policy indicates blocking.

13. The apparatus of claim 8, the instructions further configured to:
   maintain a data usage record for the application; and
   block the sending of the network data based on the application exceeding a data usage limit.

14. At least non-transitory one computer-readable storage medium comprising instructions that, when executed, cause a system to:
   receive a network stream at a local gateway application on a device, the network stream associated with an application separate from the local gateway application on the device;
   modify the network stream to generate a modified network stream;
   send the modified network stream to an operating system on the device via an unprotected network socket, the operating system generating a plurality of modified network stream packets from the modified network stream;
   receive the plurality of modified network stream packets from the operating system;
   make packet-level modifications to one or more of the modified network stream packets;
   determine a network connection policy based on the application;
   send the plurality of modified network stream packets to a destination network via a protected network socket address when the network connection policy indicates sending;
   receive an application network connection from the application on the device, the application network connection received as a plurality of application network connection packets;
   modify the plurality of application network connection packets for resending through the operating system; and
   send the plurality of application network connection packets through the operating system to generate the network stream.

15. The non-transitory computer-readable storage medium of claim 14, the network connection policy indicating encrypted proxy relay via a VPN server, comprising further instructions that, when executed, cause a system to:
   register an unprotected network socket with a network connection registry for sending to the VPN server;
   identify the plurality of modified network stream packets for sending to the VPN server based on receiving the plurality of modified network stream packets from the unprotected network socket via the operating system; and
   encrypt the plurality of modified network stream packets prior to sending the plurality of modified network stream packets to the destination network address for the VPN server encapsulated within a plurality of VPN network connection packets.

16. The non-transitory computer-readable storage medium of claim 14, wherein the plurality of modified network stream packets are received from the operating system based on a registration of a local virtual private network component as a virtual private network service provider with the operating system for the device.

17. The non-transitory computer-readable storage medium of claim 14, comprising further instructions that, when executed, cause a system to:
   maintain a data usage record for the application; and
   block the sending of the network data based on the application exceeding a data usage limit.

* * * * *